W. H. FILER.
PROCESS OF MOLDING MONOLITHIC STRUCTURES.
APPLICATION FILED MAY 19, 1915.
1,150,354.
Patented Aug. 17, 1915.
3 SHEETS—SHEET 3.
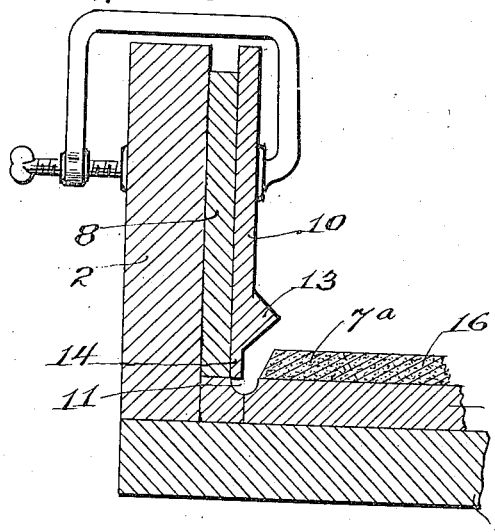
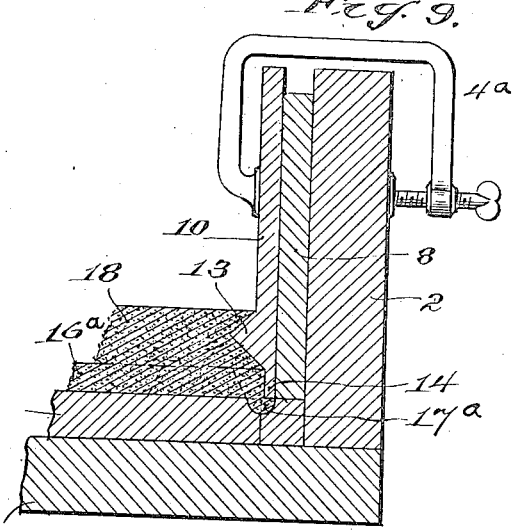
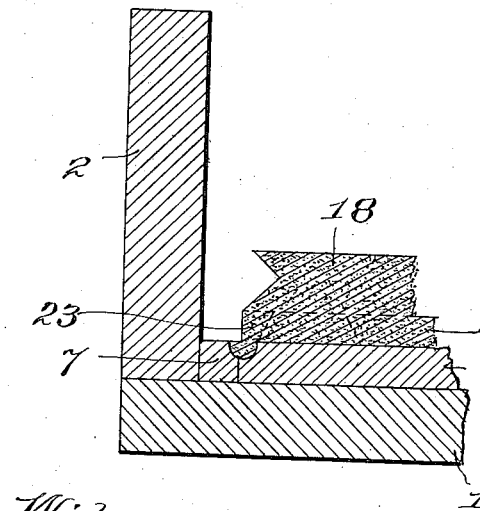
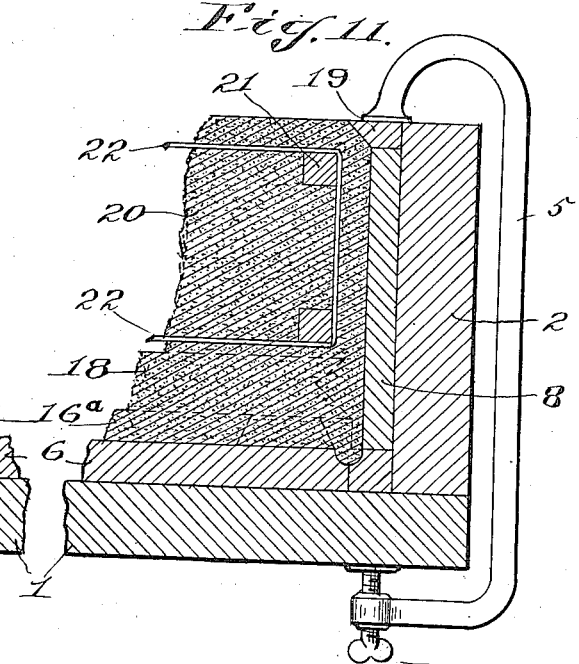
Witnesses:
R. F. Lansdale
W. F. Crossman
Inventor:
William H. Filer
By W. H. Wills,
Attorney

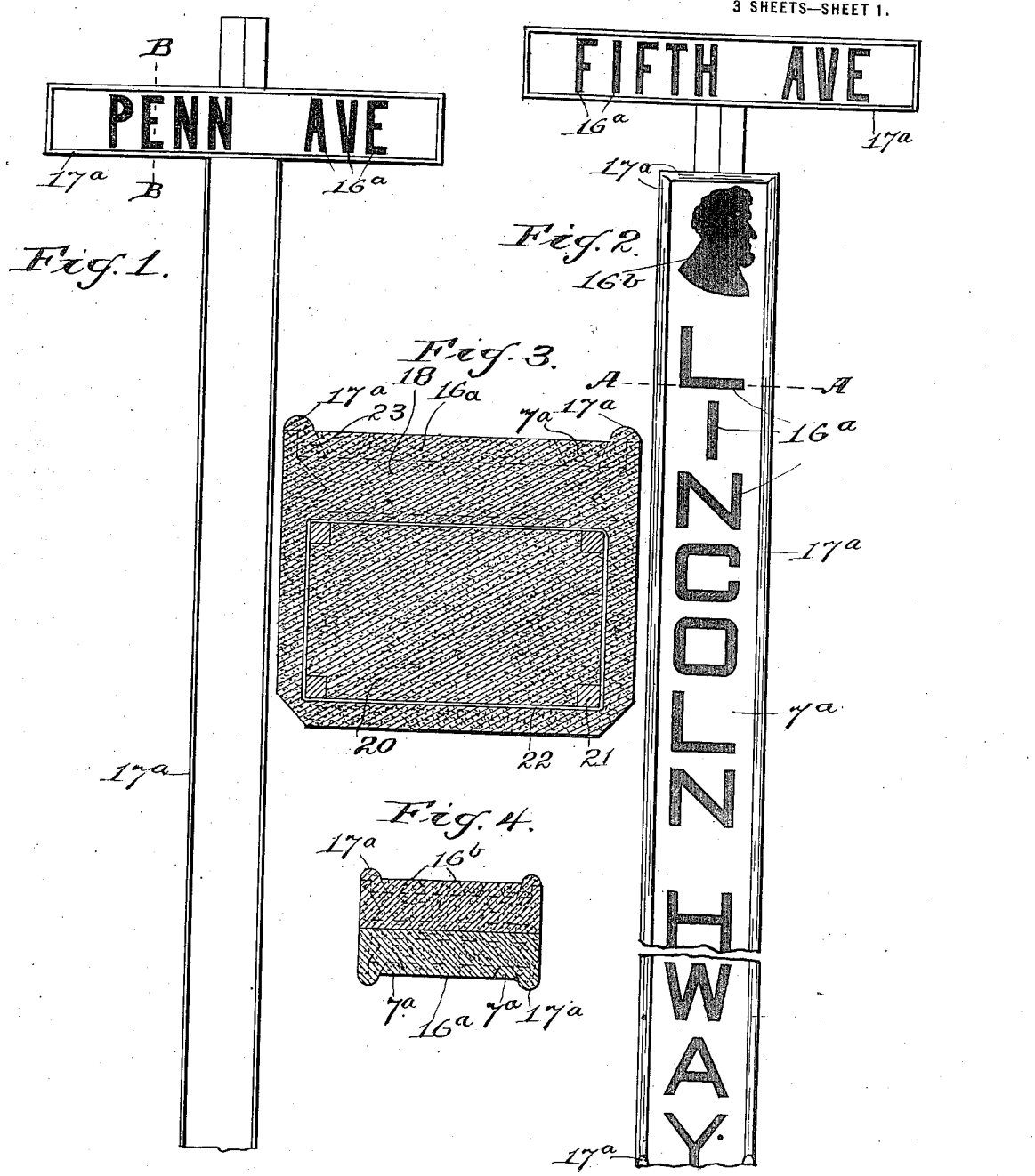

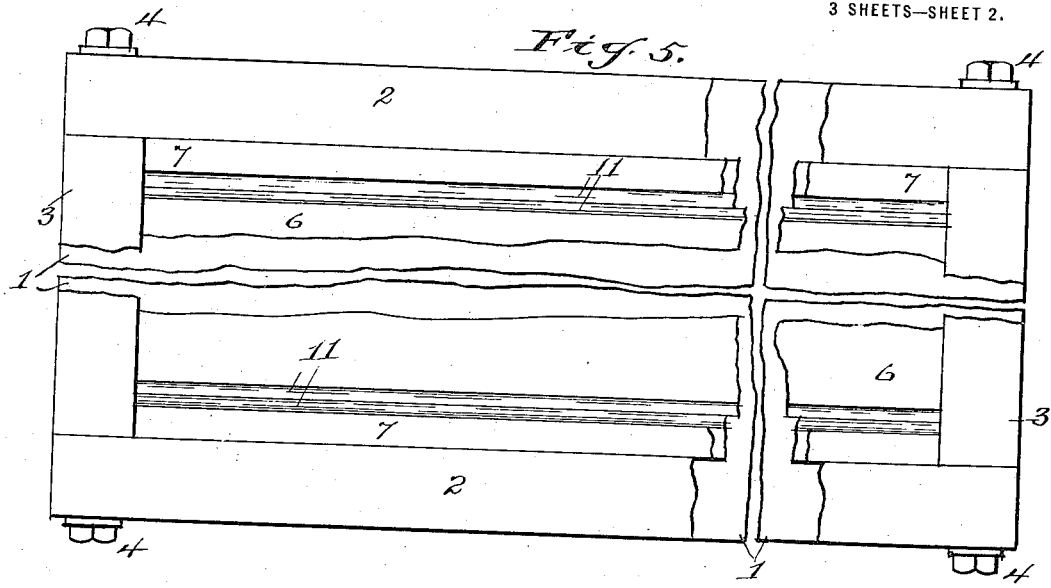
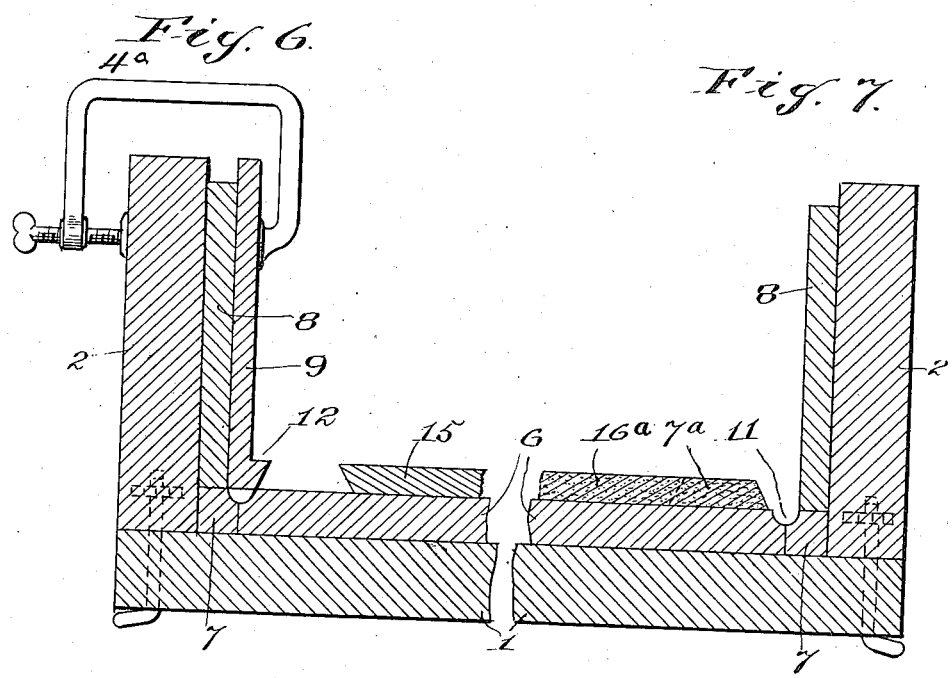

UNITED STATES PATENT OFFICE.

WILLIAM H. FILER, OF GROVE CITY, PENNSYLVANIA.

PROCESS OF MOLDING MONOLITHIC STRUCTURES.

1,150,354.  Specification of Letters Patent.  Patented Aug. 17, 1915.

Application filed May 19, 1915. Serial No. 29,176.

*To all whom it may concern:*

Be it known that I, WILLIAM H. FILER, a citizen of the United States, residing at Grove City, in the county of Mercer and State of Pennsylvania, have invented certain new and useful Improvements in Processes of Molding Monolithic Structures, of which the following is a specification.

This invention relates to the art of making articles composed of variously colored plastic materials in one monolithic body.

The object of the invention is to provide a process of combining variously colored plastic materials into one solid or monolithic body or article whereby any desired inscription sign, or other display may be permanently formed in such article or body and displayed in colors upon the face or outer surface of the article or body.

A further object of the invention is to provide a process of combining plastic material of various colors and in such relative proportions as to produce a solid body possessing as integral parts thereof the material in natural colors of the object or article displayed in said body.

A still further object of the invention is to provide a process of combining two or more colored masses of plastic material in such manner and in such relative proportions as to produce in one and the same article, object, or figure, a solid mass or monolithic body having each part of the figure or design show in natural or appropriate colors.

My process is used to produce many and various articles, such as street sign and lamp posts, independent slabs containing street names and other indicia, store signs for street posts, tomb stones, railroad crossing signs and posts, and for the production of letters, figures, inscription and other indicia in plastic articles of other character and design, and especially is the process applicable in the reproduction of the heads of notable persons, either independently or in the same body with a post or sign.

To these ends my invention consists in the process of molding into one monolithic body two or more plastic materials of different color as desired or as occasion may demand so as to produce in the finished mold contrasting colors the material of which shall be integral permanent parts of the mold.

In the accompanying drawings forming part of this application: Figure 1 is a side elevation, partly broken away, of a post and sign boards embodying my invention. Fig. 2 is a front view, partly broken away, of a street post and sign boards made in accordance with this invention. Fig. 3 is an enlarged cross section taken on the dotted line A—A Fig. 2. Fig. 4 is a similar view taken on the dotted line B—B Fig. 1. Fig. 5 is a top plan view, partly broken away, of part of a molding apparatus for carrying out my process. Figs. 6, 7, 8, 9, 10 and 11 are similar cross sections showing the process of molding.

The same reference characters denote the same parts throughout the several views of the drawings.

In carrying out my process I employ a frame comprising a bottom board 1, side boards 2, and ends 3, suitably bolted together as at 4 so as to be moved apart after the molding process is completed. The frame is adapted to contain the molding apparatus, the parts of which are held in place by suitable clamps as 4$^a$ and 5 during the process of molding. The molding apparatus comprises a base board 6, corner pieces 7, outer side boards 8, and inner side boards 9 and 10. The adjacent upper corners of the board 6 and of the pieces 7 are cut out lengthwise so as to jointly form a groove 11. The board 9 has an enlarged beveled bottom edge forming an off set shoulder 12. The board 10 has a V shaped projection on the inner face thereof, and a bottom flange 14, from which the lower face of the projection 13 extends.

In perfecting a mold according to my process, I employ powdered plastic material of various colors in dry and dampened condition for molding into one monolithic body various articles or objects as desired in contrasting colors, and the process is carried out as follows:—The base board 6, the pieces 7, and boards 8 having been assembled in the molding frame, the boards 9 are first temporarily clamped to the boards 8, with the off set 12 over-lapping the grooves 11, the patterns of whatever design, figure or inscription is desired to be reproduced in the completed mold should have edges beveled outwardly from the front face thereof, and the patterns (for example) for the front face of a street post or sign board are placed with the front face of the patterns upon the base board 6; plastic material 7$^a$ (for example white) is packed upon the base board 6, around the pattern 15, against the off set 12, and flush with the off set shoulder and with the back face of the pattern; the pattern is then removed, and the space or opening left by the pattern is packed with plastic material 16 of another color (for example blue) forming plastic sign letters 16ᵃ or other indicia, and the head 16ᵇ; the boards 9 are then removed, and the boards 10 are clamped in position; the grooves 11 and the space between the flange 14 and the adjacent edge of the white front material 7ᵃ are packed with plastic material 17ᵃ, of another color (for example red) flush with the face of the materials 7ᵃ and 16, for producing a raised border or bead 17ᵃ; then the materials 7ᵃ, 16ᵃ and 17ᵃ are covered with a layer of plastic material 18, which is packed under and over the V shaped projection 13; then the side boards 8 are withdrawn so as to permit the removal of the boards 10; the boards 8 are again clamped into their first position with overhanging cap pieces 19, and the final packing of concrete or plastic material 20 is proceeded with for completing the mold; and during this last packing, suitable longitudinal brace-bars 21, connected by tie wires 22, may be molded therein.

Before removing the apparatus from the mold I reverse the position of the apparatus and consequently the mold so as to place the back of the mold upon a pallet, then the apparatus is disassembled and removed, leaving the completed mold on the pallet for drying and hardening into one solid monolithic body.

It will be seen that the various materials are all interlocked in the process of molding, that the projecting border or bead material forms a key which is dovetailed into the two adjacent materials, that the said two materials are tongue and grooved into each other, and that the letter material makes an undercut interlock with the face material flush with the latter.

It will be observed that while the grooves 11 are covered by the boards 9 the off set 12 of these boards form a wall against which the first material is packed, that by removing said boards and substituting the boards 10 the flange 14 of the boards 10 only partially covers the grooves 11 thereby leaving an opening between said flange and the said first laid material for the filling in of the grooves and for the formation of the dovetailed keys.

I do not wish to be understood as confining my invention to any particular colored materials, or in the application of the process, but reserve to myself the right to make such application of the process as may come within the scope of the appended claims.

Having thus described my invention what I claim as new and desire to secure by Letters Patent is:—

1. The process of molding a plurality of plastic masses into one monolithic body for sign posts, sign boards and the like, which consists in temporarily placing a sign or other indicia pattern upon a grooved base of a molding apparatus, temporarily covering the grooves, packing a first mass upon said base between the pattern and the groove coverings, removing the pattern, packing the pattern-made openings with a second mass, removing said covers and substituting covers which partially close the grooves, filling the grooves and space between the partial coverings and the first mass with a third mass, packing a fourth mass upon the previously laid masses, removing the partial coverings, then completing the mold by packing a fifth mass upon the fourth mass and into the spaces left by the removal of the partial coverings, reversing the molding position of the apparatus containing the mold, disassembling the apparatus, and permitting the mold to harden.

2. The process of molding a plurality of plastic masses of contrasting colors into one monolithic body for sign posts, sign boards and the like, which consists in temporarily placing a sign or other indicia pattern upon a grooved base of a molding apparatus, temporarily covering the grooves, packing a white mass upon said base between the pattern and the groove coverings, removing the pattern, packing the pattern-made openings with a colored mass, removing said covers and substituting covers which partially close the grooves, filling the grooves and space between the partial coverings and the white mass with a mass in a contrasting color, packing a mass of white upon the previously laid masses, removing the partial coverings, then completing the mold by packing a mass of gray upon the last laid white mass and into the spaces left by the removal of the partial coverings, reversing the molding position of the apparatus containing the mold, disassembling the apparatus, and permitting the mold to harden.

In witness whereof I hereunto set my hand in the presence of two witnesses.

WILLIAM H. FILER.

Witnesses:
D. M. WALTERS,
C. A. FILER.